SHIFT REGISTER

Filed Dec. 12, 1966

2 Sheets-Sheet 1

United States Patent Office

3,471,711

Patented Oct. 7, 1969

3,471,711

SHIFT REGISTER

Werner F. Poschenrieder and Max Schlichte, Munich, Germany, assignors to Siemens Aktiengesellschaft, a corporation of Germany Filed Dec. 12, 1966, Ser. No. 601,057
Claims priority, application Germany, Dec. 14, 1965, S 100,954
Int. Cl. G06f 3/04
U.S. Cl. 307—112 12 Claims

ABSTRACT OF THE DISCLOSURE

A shift register operable as a timing chain circuit wherein the transmit time of each stage is independent of the magnitude of reactive components employed therein, and operable as a filter of desired selective characteristics by use of appropriate reactive components. Shifting occurs by energy interchanges between shunt capacitors connected to conducting lines and separated by switches in one line which are periodically closed at prescribed time periods and in a prescribed order by shift pulses. Additional circuit provisions minimize or eliminate loss of signal energy in the register.

BACKGROUND OF THE INVENTION

Field of the invention

This invention relates to a shift register and, more particularly, to a shift register controlled by shift pulses to effect a delay or frequency filtering of an applied signal. The shift register of the invention has particular applicability for use as a timing chain circuit in electrical communication apparatus.

Description of the prior art

The prior art, including the electrical communication art, teaches the use of timing chain circuits for various purposes. One purpose is to delay, by a desired amount, the transmission of electrical information and particularly of information represented by electrical impulses. U.S. Letters Patent 2,912,576, corresponding to German Patent 958,127, discloses such an impulse timing chain circuit.

Timing chain circuits comprise a number of individual stages, each of which includes reactive components such as capacitors and inductors. The properties of the reactive components determine the delay times of each stage of the chain circuit. If the inductance of a coil or the capacitance of a capacitor changes, for example, as a result of aging or due to temperature variations during operation, the resultant variation of the reactance values may vary the delay time of the given stage and thus the time delay characteristics of the timing chain circuit. Such variations are normally greatly undesirable.

In prior art timing chain circuits, if the delay time per stage is to be very long, the reactive elements, such as the coils and capacitors of each stage, have to have a correspondingly large inductive or capacitive reactance, with the result that the reactive elements must be of undesirably large physical dimensions. Where such long delay periods per stage are to be provided, the physical dimensions of the components of the stage become undesirably large, particularly in relation to the physical dimensions of other elements and systems associated therewith.

SUMMARY OF THE INVENTION

These and other objections and defects of prior art systems are overcome by the shift register and frequency filter system of the invention.

In accordance with the invention, the functions of an impulse timing chain circuit are provided by a shift register controlled by shift pulses of prescribed repetition rates. The delay time of each stage of the shift register of the invention is independent of the magnitude of the reactive components incorporated therein. As a result, a shift register constructed in accordance with the invention may provide a long delay time, as desired, per stage without the necessity of employing reactive components of large reactive values and resultant large physical dimensions. The shift register of the invention may also be operated as a frequency filter to provide selective filtering of signals comprising either amplitude-modulated impulse trains or sine wave signals.

The shift register of the invention, similarly to a line balancing network or artificial line, includes a pair of line conductors connected to the input terminals of the register. Shunt capacitors are connected between the conductors and are controlled by switches included in one of the conductors. Shift pulses of prescribed time relationships are applied to the switches to periodically close the switches and permit a pulse-type energy interchange or exchange between the capacitors, thereby effecting shifting through successive stages of the register. The prescribed time relationship of the pulses comprises a timing-spacing of the shift pulses applied to adjacent switches and, where more than two switches are included in the register, the shift pulses are applied simultaneously to switches which are separated in the line conductor by an odd number of other switches.

The shift register of the invention is operable as a frequency filter. In such a mode of operation, the capacitance value of the shunt capacitors is selected in accordance with the desired filter characteristics. All shunt capacitors may have equal capacitance values, or selected ones of a plurality of shunt capacitors may be grouped, the capacitors of each such group being assigned a particular capacitance value. By appropriate selection of the capacitance values, the desired characteristics of the filter may be obtained. As noted previously, a shift register in accordance with the invention provides a delay for each stage which is independent of the changes in properties of the associated shunt capacitors; for the same reasons, the shift register of the invention when designed as a frequency filter is independent of changes in the values of the associated capacitors, whereby the desired frequency characteristics of the filter remain substantially constant and are independent of changes in the capacitance values.

The shift register of the invention may also include additional switching means which are operative to compensate for losses occurring in the energy interchange between the capacitors thereof, whereby losses occurring in transmission of the input signal through the shift register are extremely low or substantially completely eliminated. Various forms of additional switching means for performing this function are set forth in detail hereafter. The frequency filters of the invention may have very low resonant frequency characteristics while employing relatively inexpensive and physically small reactance elements.

DETAILED DESCRIPTION OF THE INVENTION

Figures 1, 2:
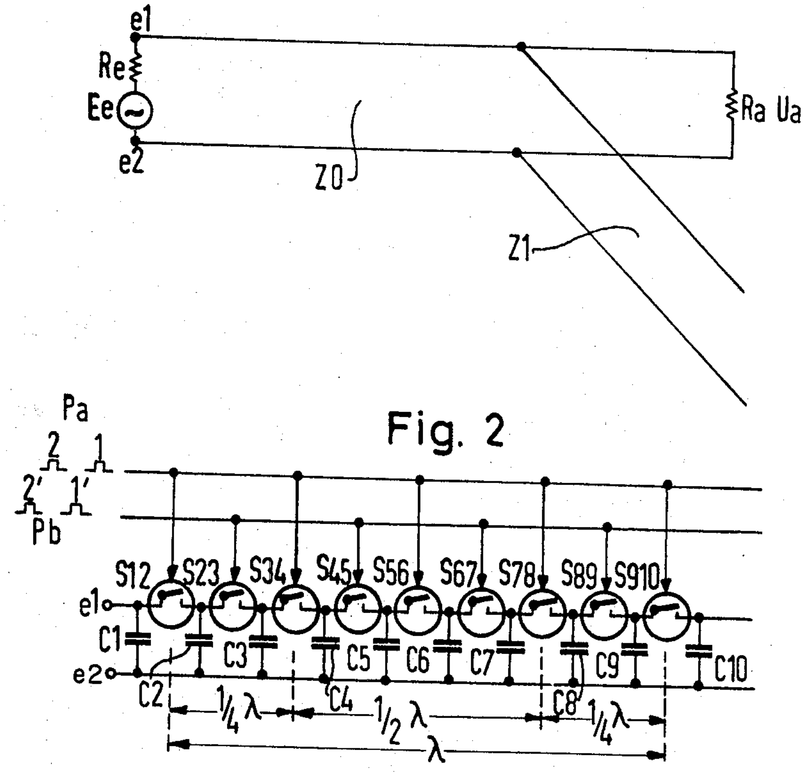
FIG. 1 is a simplified schematic illustration of a frequency filter and assists for explaining the mode of operation of the shift register of FIG. 9.
FIG. 2 is a schematic of a shift register of the invention which can be utilized as an impulse timing chain circuit and also as a frequency filter.

In FIG. 2, there is shown a shift register in accordance with the invention including first and second line conductors connected to the input terminals *e1* and *e2*, respectively. Capacitors C1, C2 . . . and C10 are connected in shunt between the first and second line conductors. A plurality of switches S12, S23 . . . S910 are provided with their contact terminals in a series connection in the first conductor. Each of the switches is connected at its terminals to the junctions of a pair of adjacent shunt capacitors. A train of periodic shift pulses $P_a$ are applied through a common shift pulse line simultaneously to a first set of switches S12, S34, S56, S78, and S910, two such shift pulses being represented at 1 and 2. Similarly, a train of shift pulses $P_b$ is applied through a common shift-pulse line to a second set of switches comprising the other, alternate switches S23, S45, S67, and S89, two of the train of pulses $P_b$ being represented at 1′ and 2′. Each of the pulse trains $P_a$ and $P_b$ effect simultaneous closure of the contacts of the respectively associated first and second sets of switches.

The pulses 1′ and 2′ of the pulse train $P_b$ are time-displaced from respectively associated pulses 1 and 2 of the train $P_a$, as illustrated by the spacing of these pulses adjacent their corresponding shift pulse lines in FIG. 2. As a result of this time-spacing relationship, adjacent switches are closed periodically but at different time periods whereas all switches separated in the first conductor line by an odd number of switches are closed at simultaneous time periods. The time interval which elapses between the successive closure of adjacent switches is determined by the time spacing of corresponding ones of the pulses of the pulse trains $P_a$ and $P_b$.

The operation of the shift register of FIG. 2 will first be explained for the condition in which each of the shunt capacitors C1 through C10 is of an equal capacitance value. A further condition is that the signal impulses applied to the input terminals *e1* and *e2* occur at a frequency of 10 kc. and are amplitude modulated at a frequency of 2.5 kc. These conditions are selected merely for convenience in the description of operation and are not intended to be limiting. In accordance with the selective pulse repetition frequency and amplitude modulation frequency, it follows that during one period of the modulation signal, there occur four signal impulses in succession.

The shift pulses $P_a$ occur at a repetition rate of the same frequency as that of the signal impulses and, for the present description, therefore, at 10 kc. The shift pulses $P_a$ are timed to occur shortly after corresponding ones of the signal impulses. The shift pulses $P_b$ occur at this same repettion rate, and thus are at 10 kc., but, as noted previously, are spaced slightly in in time from the corresponding shift pulses $P_a$. The control of each stage of the shift register is effected by two corresponding shaft pulses, such as 1 and 1′, of the first and second trains of shift pulses $P_a$ and $P_b$, for each applied signal impulse.

When a first signal impulse is applied to the input terminals *e1* and *e2* of the shift register, capacitor C1 is charged to a value corresponding thereto. This first signal impulse, represented by the stored charge on capacitor C1, is conveyed from the shunt capacitor C1 to the shunt capacitor C2 by the closing of switch S12 in response to a corresponding, first shift pulse 1 of the first train $P_a$. The conveying, or advancing, of the first signal impulse from the first shunt capacitor C1 to the second shunt capacitor C2 is the result of a pulsed energy interchange or exchange between the two participating shunt capacitors C1 and C2.

Since the discussion thus far relates to the shift register response to a first applied signal impulse, it is assumed that the shunt capacitor C2 was initially not charged prior to the energy exchange. Following the energy exchange, the capacitor C1 has discharged and, as a result, has no charge present thereon, this charge having been transferred to shunt capacitor C2. The nature of this charge transfer will be explained more fully hereafter.

Prior to receipt of the second signal impulse, the first shift pulse 1′ of the second train $P_b$ is applied to the second shift-pulse line, thereby closing switch S23 for the duration of this shift pulse. As a result, the charge stored on capacitor C2, representing the first applied signal impulse, is advanced to capacitor C3 and capacitor C2 returns to its uncharged state.

In accordance with the conditions set forth previously, subsequently to the occurrence of the first pulse 1′ of the second train $P_b$, but shortly before the occurrence of the second pulse 2 of the first train $P_a$, the second signal impulse is applied to the terminals *e1* and *e2*. In the manner described previously, the second signal impulse effects charging of shunt capacitor C1, which charge is then advanced to capacitor C2 by closure of switch S12 in response to what is now the second pulse 2 of the first train $P_a$. Simultaneously with the advancement of the second signal impulse from shunt capacitor C1 to shunt capacitor C2, due to closure of switch S12, switch S34 is also closed and effects advancing of the charge representing the first signal impulse from capacitor C3 to capacitor C4. Shortly thereafter, the second shift pulse 2′ of the second train $P_b$ occurs. The second shift pulse 2′ closes the second group of switches, and particularly the switches S23 and S45, thereby advancing the second signal impulse from capacitor C2 to capacitor C3 and the first signal impulse from capacitor C4 to capacitor C5. The first and second signal impulses and subsequently occurring signal impulses are advanced in this sequential manner by the operation of the switches in response to the first and second trains of shift pulses $P_a$ and $P_b$.

For example, upon receipt of the fourth of the first four signal impulses, there will thereby be stored in shunt capacitors C9, C7, C5, and C3 a charge corresponding to the amplitudes of the first through the fourth signal impulses, respectively. In accordance with the frequency conditions set forth above, it will be apparent that these four charges represent information appearing during one period of the modulation frequency of 2.5 kc., and thus one wave length of the modulation information. As will be appreciated from the foregoing description, the energy interchange for each signal impulse, as controlled by the corresponding pair of shift pulses of the first and second shift pulse trains $P_a$ and $P_b$ involves two adjacent shunt capacitors. For example, the first signal impulse initially transferred to the capacitor C8 by the fourth shift pulse of the first train $P_a$ is shortly thereafter advanced to the capacitor C9 in response to the fourth shift pulse of the second train $P_b$. Thus, the storage of four signal impulses requires four pairs of shunt capacitors, each pair of shunt capacitors therefore corresponding to one-fourth of a period or wavelength of the modulating frequency. In FIG. 2, there is represented the effective wavelength of the shift register by various $\lambda$ notations, the four pairs of shunt capacitors C2 and C3 . . . C8 and C9 comprising one full period of wavelength $\lambda$ and a single such pair, such as capacitors C8 and C9, corresponding to $\frac{1}{4}\lambda$.

Successive shift pulses of the trains $P_a$ and $P_b$ effect the successive advancement of the stored information through the shift register in a stage-by-stage manner, as is apparent. The transmit time, or delay time, for advancing stored information through a segment of the delay line or shift register of FIG. 2, defined as a portion of the shift register extending between two switches which are controlled by the same shift pulse, is determined by the pulse reptition rate of the shift pulses and is independent of the capacity of the shunt capacitors. For example, such a segment of the shift register or delay line of FIG. 2 comprises the portion between switches S12 and S34. The shift pulses, such as 1 and 2 of the first train $P_a$, occur at a 10 kc. rate. Thus, upon receipt of a first signal impulse at the terminals 31 and 32, the first shift pulse 1 will advance this signal impulse to storage capacitor C2. In accordance with the further advancing of the charge by the corresponding shift pulse 1' of the second train $P_b$, there will thereafter occur the second shift pulse 2 of the first train $P_a$ with resultant closure of switch S34 and storage of the signal impulse by shunt capacitor C4. It is apparent therefore that the rate of advancement of the signal impulse from a first stage to a second stage, such as from capacitor C2 to capacitor C4 and thus through the section of the delay line connecting switches S12 and S34, is determined by the repetition rate of the shift pulses. For a prescribed pulse repetition rate of 10 kc., it is apparent that the delay time per stage of the shift register of FIG. 2 is 100 microseconds. This delay time or transmit time is determined by the pulse repetition rate of the shift pulses, independently of the associated shunt capacitors. For example, if the pulse repetition rate of the shift pulses were twice as large, then the delay time between two switches, such as S12 and S34, which are controlled by the same shift pulse train, would be only half as large. It also follows that the storage of an entire period of the modulation frequency would require twice the number of shunt capacitors and associated switches, compared to that in the example given.

In the preceding description, it was assumed that the information was supplied in a form of signal impulses. The system of FIG. 2, however, may also be adapted for effecting desired delays of sine wave information signals. For this purpose, an additional switch (not shown) may be provided which may be controlled by shift pulses to produce signal impulses representative of the sine wave information and corresponding to the signal impulses discussed previously. The signal impulses of the previous discussion may therefore actually comprise scanning samples of a sine wave information input. It is noted that, in accordance with the scanning theorem more than two scanning samples are derived from each period of the sine wave vibration. For the conditions set forth previously, and assuming the amplitude modulation frequency of 2.5 kc. to be represented by a sine wave signal, it will be apparent that the condition of providing more than two scanning samples during each period of the sine wave vibration is in fact provided by the system of FIG. 2.

It will be apparent from the foregoing description that delay times of several periods of the modulating frequency, representing the input information, may be effected by the shift register of FIG. 2 in a highly accurate manner and with a relatively small number of elements, and correspondingly small cost. The physical size and cost of a shift register in accordance with the invention is small, even if the frequency of the applied information signal is very low, since the repetition rate of the shift pulses and not the characteristics of the shunt capacitors or other reactive elements determines the effective delay time per stage. By contrast, prior art timing chain circuits and shift registers, which determine the delay time per stage in accordance with the characteristics of the reactive components, such as the condensers and inductors of each stage, become undesirably and at times prohibitively large in physical size and high in cost of components to provide comparable time delays.

The foregoing description of the system of FIG. 2 has assumed that the applied signal impulses are advanced through the shift register in only one direction. This unilateral advancement is, in fact, obtained when the associated shunt capacitors are of equal capacitance value, and when the shift register is terminated in a nonreflecting manner, such as by terminating the output in an impedance of appropriate value. Such nonreflective terminations are well known in the art. In the example given, the terminating impedance element may comprise a resistor, across which is developed the delayed signal impulses at the output of the shift register.

In many cases, it is desired to produce reflections within the shift register, whereby shift pulses which are advancing in a first direction, from the input and toward the output of the register, are reflected and travel, at least in part, back toward the input terminals. Such reflections may be produced not only at the output terminals of the shift register but also within the shift register. Such reflections may be obtained by employing shunt capacitors of different capacitance values. By selection of appropriate values of the shunt capacitors, the shift register of the invention may also have the properties of a frequency filter.

When it is desired to construct a shift register of the invention with specified frequency filter characteristics, a pulse-type energy exchange, similar to that described previously, is made to occur between adjacent shunt capacitors which have different capacitance values. This energy or charge exchange, however, is modified in accordance with the reflection of the exchange charge. This modification is in accordance with the factor:

$$r=\frac{c_1-c_2}{c_1+c_2} \quad (1)$$

where: $c_1$ is the capacity of the shunt capacitor on which is stored a charge to be advanced, and $c_2$ is the capacity of the shunt capacitor which is to receive the charge advanced from the first capacitor.

The reflection factor ($r$) represents the ratio of the transmitted to reflected amounts of energy of a given signal impulse at the impact or reflection point in the shift register. This impact or reflection point is that at which the line impedance of the shift register changes. At the impact point of the line, the capacitance values of the associated shunt capacitors correspond to the reciprocal values of the wave impedance of the line.

In accordance with the provision of shunt capacitors of different capacitance values in the shift register of the invention, and the response thereof to the charges or voltages representative of applied signal impulses and appearing across these shunt capacitors, the shift register of the invention has analogous characteristics to those of a transmission line having a variable, or not constant, wave impedance throughout its length. The electrical signals existing in such a shift register correspond to those developed in such a transmission line. It is well known that transmission lines having varying wave impedance values may be utilized as a frequency filter (for example, see "Microwave Transmission Circuits," pp. 615–645 by G. L. Ragan). Thus, a shift register of the invention having varying shunt capacitance values may be utilized as a frequency filter.

The shift register of FIG. 2 may be utilized as such a frequency filter in accordance with the invention. For example, capacitors C2, C3, C8, and C9 may each have three times the value of capacitance of that of capacitors C1 and C10, and the capacitors C4, C5, C6, and C7 may have only one-third the value of capacitance of that of capacitors C1 and C10. A shift register constructed in accordance with the circuit of FIG. 2 and having these relative values of shunt capacitors was operated and demonstrated the following characteristics. Signal impulses having a pulse repetition rate of 10 kc. and modulated in amplitude at a frequency of 2.5 kc. are transmitted through the shift register-filter without attenuation, while signal impulses of an equal pulse repetition rate of 10 kc. but with a modulation frequency of 1.6 kc. were attenuated by about 2.3 db.

The wavelength notations accompanying the schematic diagram of FIG. 2 illustrate the effect of the provision of groups of capacitors of different capacitance values. The group comprising the shunt capacitors C2 and C3, and the group comprising shunt capacitors C8 and C9 each correspond to a line wherein there is formed a wave of ¼λ wavelength. The group comprising shunt capacitors C4, C5, C6, and C7 correspond to a transmission line wherein there is formed a wave of ½λ wavelength.

By analogy to the known technique of employing transmission lines as frequency filters, a shift register of the invention may be operated as a frequency filter.

Figure 9:
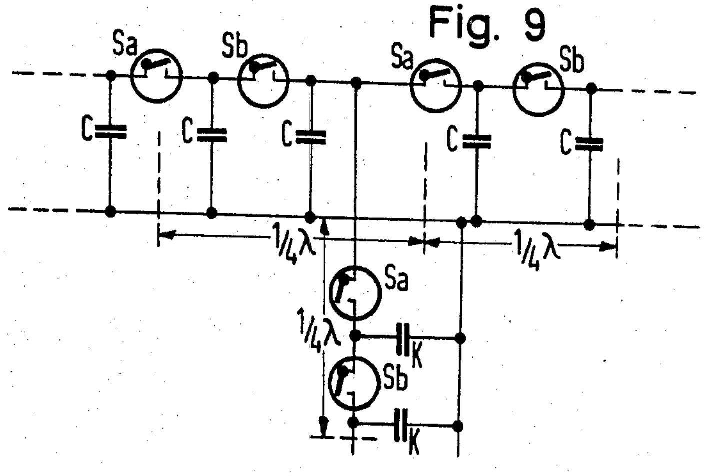
FIG. 9 is a schematic showing an embodiment of the shift register of the invention as a frequency filter operative as a quadripole, or four terminal, network.

FIG. 1 is a simplified circuit and assists in the explanation of the operation of a shift register as a frequency filter. In FIG. 1, signal generator E*e* is connected in series with resistor R*e* to the input terminals *e*1 and *e*2 of the transmission line Z0. The transmission line Z0 is terminated in an impedance, represented as resistor R*a*, across which is developed the output voltage U*a*. A tap transmission line Z1 is connected to the transmission line Z0. The transmission lines Z0 and Z1 of FIG. 1 represent first and second shift registers, respectively, constructed in accordance with the invention. The input terminals of the second shift register are connected at a position in the first shift register between two adjacent shunt capacitors, each of the first and second shift registers being similar in construction and controlled in operation by similar shift pulses. In FIG. 9 is shown a schematic of an embodiment of the invention having the characteristics of the transmission line of FIG. 1.

In FIG. 9, the shunt capacitors K of the second shift register have a capacitance value different from that of the shunt capacitors C of the first shift register at which it is connected. The switches S*a* in each of the first and second shift registers are controlled by shift pulses $P_a$ (not shown), as indicated in FIG. 2, and the switches S*b* in each of the first and second shift registers are controlled by pulses $P_b$ (not shown) also indicated in FIG. 2. The operation of a frequency filter constructed in accordance with the teachings of FIGS. 1 and 9 will be in accordance with the same operating conditions discussed previously with regard to the shift register of FIG. 2, when the latter is operated as a frequency filter.

In FIG. 9, by selection of appropriate values of shunt capacitors K of the second shift register, relatively to those of the group of capacitors C of the first shift register, the latter includes two ¼λ sections between which is connected the second shift register which also is effectively ¼λ in length. The second shift register introduces a ½λ delay of the signal impulse in transmission from the first to the second ¼λ sections of the first shift register. Thus, the frequency characteristics of the shift register of FIG. 2, when constructed with different capacitance values for the various groups of the capacitors C1–C10, as discussed previously, are achieved in the circuit of FIG. 9, but with a smaller total number of switches and shunt capacitors.

It is noted that a shift register of the invention, when operated as a frequency filter, has a characteristic impedance value corresponding to the wave impedance of a comparable transmission line. This characteristic impedance value is reciprocally proportional to the capacitance values of the associated shunt capacitors. The shift registers of the invention permit the use of shunt capacitors of greatly varying or different capacitance values, whereby substantial changes of the wave impedance of the shift register may be provided. Thus, any desired one of a wide range of frequency characteristics may be imparted to a shift register of the invention, when operated as a frequency filter.

Figure 3:
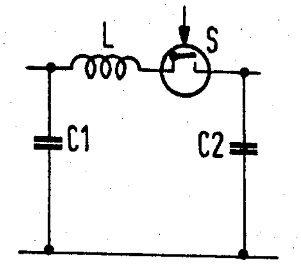
FIGS. 3 and 4 show first and second embodiments of additional switching means which may be incorporated with the shift register of the invention to eliminate energy loss in the energy interchange between successive switching stages.

FIG. 3 is a schematic illustrating one circuit arrangement for substantially reducing energy losses normally occurring during pulse-type energy exchanges between shunt capacitors. A charge representative of a signal pulse and initially stored on shunt capacitor C1 is to be transferred to, and stored on shunt capacitor C2 in accordance with the closure of the switch S in response to an applied shift pulse. An inductance coil L is inserted in the conductor line associated with switch S whereby, upon closure of switch S, inductor L and switch S are connected in series between capacitors C1 and C2. This series circuit has a resonant frequency defined by the values of the capacitors C1 and C2 and of the inductor L.

Switch S is closed for a time interval equal to that of one-half of a cycle, or one-half of the period of, the resonant frequency. If initially there is present a certain charge on one or both of the shunt capacitors C1 and C2, and assuming that the capacitors C1 and C2 are of equal capacitance values, a complete energy exchange or interchange occurs between the two shunt capacitors C1 and C2. This circuit arrangement for avoiding loss of signal impulse energy is well known (see, for example, "Pulse Generators" by Glasoe and Lebacqz, 1948, pp. 307–308, Figs. 8.17 and 8.18). If the shunt capacitors C1 and C2 are of different capacitance values, the charge interchange is modified in accordance with the reflection factor ($r$) defined above in Equation 1.

An inductor L, inserted between two respectively associated shunt capacitors of a shift register, therefore, is effective to assure that the desired energy interchange between the associated shunt capacitors is performed, whether it be a complete exchange or, in the case of reflection, a partial exchange. The loss of one half of the transmitted energy, which otherwise would occur in the absence of such an inductor, is avoided. It is significant that the resonant frequency of the circuit defined by such an inductor and its associated shunt capacitors may be considerably shorter than the transmit time or delay time which the segment of the line including these two associated shunt capacitors is to provide. Prior art timing chain circuits (see, for example, German Patent 958,127) provide successive stages in each of which the resonant frequency of the associated reactive elements determines the delay time per stage. By contrast, the inductor employed in FIG. 3 serves only to avoid energy losses, and the delay time is determined by the switching interval defined by the repetition rate of the shift pulses.

A shift register constructed in accordance with the invention and employing the circuit of FIG. 3 in each stage thereof may provide the same delay time per stage as that provided by a prior art timing chain circuit, while employing inductors of substantially smaller size than those required in the prior art timing chain circuits. As a result, substantial savings both in physical size and in construction costs for a delay or filter network having analogous operating characteristics may be realized.

FIG. 3 may be modified by substituting a short circuit connection in place of shunt capacitor C2 .This modification effects a substantial change in the operating conditions of the circuit of FIG. 3. By closing switch S for one-half period of the resonant frequency of the inductor L and capacitor C1, the charge initially present on capacitor C1 is thereafter again developed on capacitor C1 of substantially the identical magnitude but of opposite polarity. Such a charge reversal effect is well known in the art.

Figure 4:
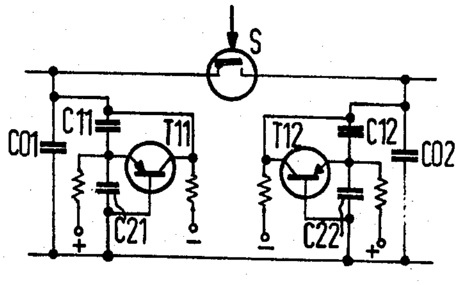

FIG. 4 comprises a schematic of another circuit arrangement wherein energy losses otherwise occurring during a pulse-type energy exchange between shunt capacitors, such as in a switching stage of a shift register in accordance with the invention, may be avoided. A pulse-type energy exchange between shunt capacitors C01 and C02, which are of equal capacitance values, is controlled by the closure of switch S. The energy losses are compensated through the provision of parallel supplemental capacitors and amplifier elements associated with the shunt capacitors C01 and C02.

Generally, each supplemental capacitor is charged by the amplifier element from the latter's energizing current source during the time period preceding an energy exchange, whereby the voltage on the supplemental capacitor corresponds to that across the shunt capacitor. During the subsequently occurring pulse-type energy exchange between the shunt capacitors, the energy stored in the supplemental capacitor is available to compensate for losses to assure a charge transfer of the required magnitude. As a result, for each periodic closure of the switch S, and by providing supplemental capacitors of equal capacitance values to those of associated shunt capacitors, a substantially complete energy exchange is effected between the thus compensated, two shunt capacitors C01 and C02.

In FIG. 4, the supplemental capacitor C11 is connected in parallel with the shunt capacitor C01 through a parallel network comprising the emitter-base circuit of transistor T11 and coupling capacitor C21. The transistor T11 is connected at its collector terminal through a dropping resistor to a negative power supply terminal and at its emitter terminal to a positive power supply terminal. In an identical manner, transistor T12 and capacitor C22 connect supplemental capacitor C12 in parallel with the associated shunt capacitor C02.

In operation, one of the two shunt capacitors C01 and C02 is charged during the relatively large time interval preceding a pulse-type energy exchange, the other not being charged initially. Subsequently to the energy exchange, the other shunt capacitor is charged to the full amount of the charge previously established on the first shunt capacitor which then is completely discharged. If each of the shunt capacitors is initially charged, the switching operation provides an exchange of these charges. This method of energy exchange and compensation is explained in detail in Belgium Patent 657,316 (corresponding to German patent application S 88,828 and U.S. patent application 417,970 filed in the name of Max Schlichte and assigned to the assignee of the present invention). The following discussion provides a brief description of the operation of the circuit of FIG. 4 sufficient for an understanding thereof.

One condition of the circuit operation is that only negative potentials appear at the terminals of capacitors C01 and C02 which are connected with corresponding terminals of the switch S. This condition may be satisfied even where alternating current signal impulses are applied, by providing appropriate bias potential sources. A convenient manner for maintaining the desired negative bias potential is by including a negative bias potential source in the signal impulse generator which applies the signal impulses to the circuit of FIG. 4. It is assumed in the following discussion that the necessary negative bias potential is provided.

In accordance with the previous discussions, it will be understood that a complete energy interchange occurs when the shunt capacitors C01 and C02 are of equal capacitance values. An energy interchange, though only partial, will also occur even though the shunt capacitors C01 and C02 are of different capacitance values. Where the shunt capacitors are of different capacitance values, the charge interchange is modified due to reflection in accordance with the factor ($r$) set forth in Equation 1 above. Each supplemental capacitor, however, is of the same impedance value as its respectively associated shunt capacitor. The switch S is operated by shift pulses, in the manner previously described, and the energy interchange is effected substantially without any loss of energy of the charges representing the signal impulses. Further, in accordance with the corresponding modification of FIG. 3, one of the shunt capacitors, such as capacitor C02, and its associated supplemental capacitor C12, coupling capacitor C22 and amplifier element T12 may be eliminated and in the alternative a short circuit connection provided.

In accordance with this modification of the circuit of FIG. 4, a periodic closing of switch S will effect a periodic reversal of polarity of the charge initially stored on shunt capacitor C01, the magnitude of the charge, however, being substantially identical to that of the initial charge.

Upon closure of switch S, and assuming shunt capacitor C01 and its associated supplemental capacitor C11 to have initially been charged, each of these capacitors discharges. As stated previously, the capacitor C11 is charged initially in the same magnitude and polarity as is the shunt capacitor C01. The charge thus previously established on supplemental capacitor C11 charges capacitor C21, which was initially not charged, to a value of the same magnitude but of opposite polarity to the initial charge on capacitor C11.

When switch S thereafter is opened, the charge stored on coupling capacitor C21 causes transistor T11 to conduct and to develop a charge on capacitors C11 and C01 corresponding to the charge established on the coupling capacitor C21. In this manner, the shunt capacitor C01 has developed thereacross a charge of equal magnitude but of opposite polarity to that charge initially established thereon. Thus, for the modified form of the compensating circuit of FIG. 4 in which shunt capacitor C02 and associated elements are replaced by a short circuit connection, closure of switch S will effect a reversal of the charge on shunt capacitor C01.

Each of the circuits of FIGS. 3 and 4 is operative to substantially eliminate the loss of power during the energy interchange between the associated shunt capacitors. However, in the circuit of FIG. 3, as previously described, switch S must be closed for a precise time interval equal to that of one-half cycle or one-half of the period of the resonant frequency of the series inductor and associated shunt capacitors. Should the switch be closed for a longer period, the energy interchange will reverse in direction and the transmitted charge on the shunt capacitor C2 will begin to be retransmitted to the shunt capacitor C1. In each of FIGS. 3 and 4, however, the duration of the interval of the shift pulses is independent of the pulse repetition rate thereof, under the condition that the duration of a shift pulse be smaller than the period of the pulse repetition rate of the shift pulses. If the shift pulses are of substantially smaller duration than the period of the repetition rate of the shift pulses, a considerable tolerance is provided for inserting the shift pulses of the second train $P_b$ between successive shift pulses of the first train $P_a$ (FIG. 2), and a symmetrical relationship of these pulses is not required. An advantage of the circuit of FIG. 4 over that of FIG. 3 is that the switch S need not be closed for any specified time interval since the energy exchange is not related to the period of a resonant circuit, as is required in the circuit of FIG. 3. FIG. 4 therefore permits a far greater tolerance in the duration of the switching interval and thus in the duration of the shift pulses.

The effectiveness of the circuit of FIG. 4 for preventing loss of energy during an energy exchange is related to the capacitance values of the supplemental capacitors C11 and C12. If the capacitance value of capacitors C11 and C12 is greater than that of the respectively associated shunt capacitors C01 and C02, amplification of the charges is effected during the energy exchange; conversely, a relatively smaller value of capacitance will effect a weakening or reduction in the level of the exchanged energy. These relationships are set forth in the above-cited Belgium Patent 657,316. By utilizing the amplifying effect which may be obtained from the supplemental capacitors the circuit arrangement of FIG. 4 may be employed in the shift register of the invention, such as that shown in FIG. 2, to provide essentially lossfree characteristics.

The system of the invention has been described thus far in an embodiment comprising a four terminal or quadripole device, as shown in FIG. 2. As noted, the circuits of FIGS. 3 and 4 may be incorporated in the shift register of FIG. 2 to provide substantially loss-free characteristics. The circuits of FIGS. 3 and 4 also may be utilized in a dipole or two terminal arrangement in accordance with the invention.

Figure 5:
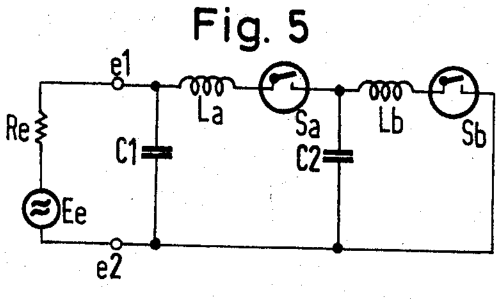
FIGS. 5–8 comprise embodiments of the shift register of the invention operative as dipole or two terminal frequency filters.

FIG. 5 comprises a dipole embodiment of the invention, utilizing the circuit arrangement of FIG. 3, and operative as a line balancing network. The line balancing network includes the shunt capacitors C1 and C2 and is connected at its input terminals *e*1 and *e*2 to a signal source. The output terminals of the line balancing network are short circuited, rendering the network equivalent to operation without any load. The line balancing network of FIG. 5 may be utilized in the shift register of FIG. 9 to provide special characteristics, as will be described hereafter.

In FIG. 5, an induction coil L*a* is connected in series with the switch S*a* in the first conductor line connected to terminal *e*1. One terminal of each of the shunt capacitors C1 and C2 is connected to the first line. An induction coil L*b* is connected in series with switch S*b* in the first conducting line to the junction of shunt capacitor C2 and switch S*a*, and through a short circuited return path to the other terminal of capacitor C2 and the second input terminal *e*2. The circuit of FIG. 5 has the properties of a dipole or two terminal device with parallel resonance. For purposes of explaining the operation of the circuit of FIG. 5, it is assumed that signal impulses are applied to the input terminals *e*1 and *e*2 by a generator E*e* connected to these terminals through resistor R*e*.

Switches S*a* and S*b* are controlled by first and second trains of shift pulses which are displaced in time relatively to each other and each of which trains occurs at a pulse repetition rate which is twice that of the impulse frequency of the signal impulses. Assuming that capacitor C1 is initially charged by a signal impulse, switch S*a* is thereupon closed by the first shift pulse of the first train to transmit the charge from shunt capacitor C1 to shunt capacitor C2. The first shift pulse of the second train closes switch S*b* with the result that the polarity of the charge established on shunt capacitor C2 reverses but is of the same magnitude as initially established. Thereafter, the second shift pulse of the first train again closes switch S*a* and the charge on shunt capacitor C2 is transmitted to the shunt capacitor C1. Capacitor C1 now contains a charge of the same magnitude but of the opposite polarity to that which was initially established thereon by the first signal impulse. The second shift pulse of the second train produces no effect in closing switch S*b* since capacitor C2 is now discharged and switch S*a* is open at this time.

If the applied signal impulses represent an alternating potential, and if the second signal impulse applied to the terminals *e*1 and *e*2 is of the opposite polarity relatively to the first signal impulse, no current is received by the dipole network of FIG. 5. Thus, the dipole network of FIG. 5 operates as a wave trap or rejector circuit and performs a blocking function. This operation, of course, requires that the effective wavelength of the dipole network be twice that of the signal impulses. This relationship is attained when the shift pulses of each of the first and second trains thereof have a pulse repetition rate which is twice that of the signal impulses. The dipole network, therefore, has the effect of a blocking circuit in parallel resonance at the applied signal frequency, and derives no energy from the signal impulses other than a minimum amount necessary to compensate for transmission losses or other losses which are inherent and unavoidable in any practical circuit.

The blocking function of the circuit of FIG. 5 may also be employed where the signal generator produces a sine wave alternating current signal. In this operation, the frequency of the alternating current input signal should be one half that of the signal impulses, on which the prior description of operation was based, and thus one-fourth of the pulse repetition rate or frequency of the shift pulses of each of the first and second trains. The blocking effect of the circuit of FIG. 5 is obtained regardless of the relative phases of the input alternating current signal and of the shift pulses. If the frequency of the input alternating current signal varies from the predetermined value, however, the blocking effect of the system of FIG. 5 is decreased subtsantially, analogous to the effect resulting from departure of an input signal from the resonant frequency of a resonant parallel circuit to which the signal is applied. If desired, an alternating current signal may be transformed to a train of impulses modulated in amplitude in accordance with the alternating current signal, the modulation frequency thereof being in accordance with the frequency of the alternating current signal. The previously described operation of the circuit of FIG. 5 in response to applied signal impulses of alternating polarity, in this regard, may be considered as a special case of a series of such amplitude modulated impulses.

The dipole network connected between the terminals *e*1 and *e*2 of FIG. 5 therefore demonstrates a parallel resonance characteristic. The specific resonant frequency of this circuit, however, is not related and, in fact, is independent of the resonant frequency of the resonant series circuits established by the induction coils, such as L*a*, in the first conductor line and the associated shunt capacitors such as C1 and C2. The resonant frequency of the dipole network is determined by the pulse repetition rate of the shift pulses.

Figure 6:
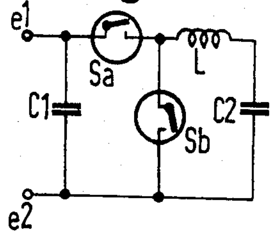

A further embodiment of the invention is shown in FIG. 6; this embodiment comprises a dipole network operative as a frequency filter and is analogous to the circuit of FIG. 5. In FIG. 6, however, the short circuit connection is established by closure of switch S*b* which is connected effectively in shunt between the shunt capacitors C1 and C2. By contrast, in FIG. 5, the switch S*b* is associated only with the shunt capacitor C2; the additional coil L*b* of FIG. 5 is eliminated, the single coil L of FIG. 6 performs the functions of both of the coils L*a* and L*b* of FIG. 5.

The similarity of the operating characteristics of the circuits of FIGS. 5 and 6 will be apparent by a consideration of the operation of the circuit of FIG. 6 in response to alternating polarity signal impulses applied to its input terminals *e*1 and *e*2. The charge initially established on shunt capacitor C1 in response to a first signal impulse is transmitted to shunt capacitor C2 upon the closing of switch S*a* in response to the first shift pulse of the first train. The function of coil L in providing substantially loss-free transmission for this pulse exchange is apparent from the foregoing description of operation of the circuit of FIG. 3. The subsequently occurring first shift pulse of the second train closes switch S*b*, effecting a reversal of the charge on shunt capacitor C2, as is also apparent from the foregoing descriptions. The second shift pulse of the first train again closes switch S*a* and the charge on capacitor C2 is then retransmitted to capacitor C1, whereby capacitor C1 is charged to a value of substantially the same magnitude but of opposite polarity to that established thereon in response to the first signal impulse. The subsequently occurring shift pulse of the second train closes switch S*b* but, since switch S*a* is open at this time, no further effect is had on the capacitor C1.

Thus, the circuit of FIG. 6 produces the identical parallel resonance effect of the circuit of FIG. 5. It will be appreciated that this effect is obtained in response to the application of a signal impulse to the terminals *e*1 and *e*2 and to the subsequent occurrence of the first shift pulse of each of the first and second trains, and the second shift pulse of the first train, prior to receipt of a further, opposite polarity, input signal impuse. As noted, the second shift pulse of the second train has no effect on the network.

Figure 7:
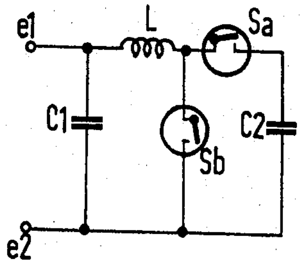

The circuit of FIG. 7 represents an alternative embodiment of the circuit of FIG. 6 in which the positions of the switch S$a$ and the coil L are interchanged. The circuit of FIG. 7 provides the identical frequency filter characteristics as those of the circuit of FIG. 6. In operation, a charge initially estabilshed on capacitor C1 in response to a signal impulse applied to the terminals $e1$ and $e2$ is transmitted to the capacitor C2 during closure of the switch S$a$ in response to the first shift pulse of the first train. The first shift pulse of the second train closes switch S$b$ but produces no resultant effect since, under the assumed operating conditions, the charge on capacitor C1 has already been completely transmitted to capacitor C2. The second shift pulse of the first train again closes switch S$a$ whereby the charge on capacitor C2 is retransmitted to shunt capacitor C1. The second shift pulse of the second train then closes switch S$b$, with the result that capacitor C1 develops a charge of the same magnitude but of the opposite polarity to that established by the retransmitted charge, and thus of opposite polarity to that of the initial charge. Thus, upon receipt of a signal impulse and the subsequent receipt of first and second shift pulses of each of the first and second trains the shunt capacitor C1 is charged to the same magnitude but the opposite polarity of the charge initially established thereon. The dipole network of FIG. 7 therefore comprises a frequency filter having the characteristics of parallel resonance substantially in accordance with the corresponding frequency filters of FIGS. 5 and 6.

Comparing the operation of the circuits of FIGS. 5–7, in the network of FIG. 7 no energy interchange results from the first shift pulse of the second train, whereas in the networks of FIGS. 5 and 6, no energy interchange occurs as a result of the second shift pulse of the second train.

Figure 8:
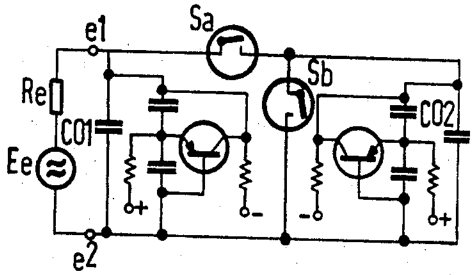

The embodiment of the invention shown in FIG. 8 comprises a frequency filter corresponding to that of FIG. 6 but wherein the circuit arrangement of FIG. 4 is employed in the alternative to that of FIG. 3 for reducing or substantially eliminating energy losses in the energy interchanges occurring during the switching operations. The operation of the circuit of FIG. 8 is substantially similar to that of FIG. 6; however, the advantages of the system of FIG. 4 are obtained whereby compensation is provided for the inherent and unavoidable losses occurring in the transmission of charges through conducting lines and the losses of the shunt capacitors. The circuit of FIG. 8 may be employed with a signal source, as represented by generator E$e$ connected through resistor R$e$ to its input terminals $e1$ and $e2$ supplying either signal impulses or sine wave alternating current signals. As described in relation to FIG. 6, the corresponding switches S$a$ and S$b$ in FIG. 8 are operated by the shift pulses of the first and second trains, respectively, the energy exchanges between the shunt capacitors C01 and C02 occurring in an identical sequence.

The shift registers and frequency filters of the invention are particularly well suited for use with time multiplex systems. Time multiplex systems typically possess several connections channels each of which presents trains of amplitude modulated signal impulses. Any of the signal sources described above may represent such connection channels of a time multiplex system for applying amplitude modulated signal impulses to the input terminals of the shift registers and frequency filters of the invention. The networks of the invention may be fed alternatively by different connection channels of a multiplex system, without special switching requirements. This capability results from the fact that suitable switches typically are provided for effecting the distribution of the signal impulse from different connection channels. Furthermore, time multiplex systems typically also include generators producing impulse trains which conveniently may be utilized for providing the trains of shift pulses employed by the networks of the invention.

The characteristics of the networks of the invention, when operated either as shift registers or as frequency filters, are ideally suited for use with multiplex systems since the pulse repetition rate of the shift pulses determines the characteristic frequency of the networks. Thus, by the simple provision of selecting an appropriate repetition rate of the shift pulses, the desired frequency characteristics of the networks may be obtained.

The shift registers and frequency filters of the invention comprise a limited number of relatively simple components, namely, switches, capacitors, and, in some embodiments, transistors, resistors, and induction coils of relatively small inductance values. The time delay per stage in a shift register of the invention, whether used as a delay network or as a filter, is independent of the values of the reactive elements thereof, or of variations therein, and is determined substantially only by the pulse repetition rates of the shift pulse trains. The networks of the invention, therefore, demonstrate very stable frequency characteristics, the particular, desired operating frequency characteristic of a given network readily being achieved by selection of appropriate pulse repetition rates. In addition to the reduction in physical size of the networks resultant from the capability of employing inductors of small inductance values and therefore of small physical size, integrated circuit techniques may readily be employed for manufacturing these networks. Further reduction in size and savings in costs of manufacturing these networks are thereby obtained, in addition to the other attendant, desirable features of integrated circuits. These savings in space and construction costs are substantial, compared to the requirements for conventional circuits of this type.

It will be evident that many changes could be made in the systems of the invention without departure from the scope thereof. Accordingly, the invention is not to be considered limited to the particular embodiments disclosed herein. It is therefore intended by the appended claims to cover all such modifications and adaptations as fall within the true spirit and scope of the invention.

What is claimed is:

1. A shift register controlled by shift pulses and comprising:

first and second line conductors connected to first and second input terminals ($e1$, $e2$) of said circuit, shunt capacitors (C1, C2, . . . ; C, C, . . . ) connected between said first and second line conductors to store pulse energy, bidirectional switch means (S12, S23, . . . ; S$a$, S$b$) connected in circuit with one of said line conductors, and means for applying periodic shift pulses to said switch means (S12, S23, . . . ; S$a$, S$b$) to effect closure thereof for producing pulse energy exchanges between said shunt capacitors (C1, C2, . . . ; C, C, . . . ), said shift pulse applying means applying time-spaced shift pulses to adjacent switch means (S12, S23, . . . ; S$a$, S$b$), said bidirectional switch means being operated by said shift pulses independently of the amplitude, polarity and direction of pulse energy stored in said shunt capacitors to enable simultaneous shifting of said stored pulse energy along said line conductors in the forward and reverse directions.

2. A shift register as recited in claim 1 wherein there is further provided:

a plurality of said shunt capacitors (C1, C2, C3 . . . ), a plurality of said switch means (S12, S23, S34 . . . ), and said shift pulse applying means including means for simultaneously applying shift pulses to each set of said switches (S12, S34, S56 . . . ; and S23, S45, S67 . . . ) between which there are connected in said line conductor an odd number of other ones of said switches.

3. A shift register as recited in claim 1 wherein:
said plurality of shunt capacitors (C1, C2, C3 . . . ) are of equal capacity.

4. A shift register as recited in claim 1 wherein:
said shunt capacitors (C1, C2, C3 . . . ) are of different capacitance values and effect a reflection of the charge during a pulse charge exchange between shunt capacitors of different capacitance values in accordance with the factor:

$$\left(r=\frac{c_1-c_2}{c_1+c_2}\right)$$

wherein $c_1$ and $c_2$ represent the capacitance values of the shunt capacitors supplying and receiving a charge, respectively, during a pulse charge exchange.

5. A shift register as recited in claim 1 wherein:
said plurality of shunt capacitors (C1, C2, C3 . . . ) are arranged in groups, each of said groups defining a segment of said shift register and including a number of shunt capacitors of equal capacitance value differing from that of another group thereof,
the groups of shunt capacitors of different capacitance values effecting a charge reflection during pulse energy exchanges therebetween and determining the effective wavelength characteristic of the segment of the shift register comprising each of said groups.

6. A shift register controlled by shift pulses and comprising:
first and second line conductors connected to first and second input terminals (*e*1, *e*2) of said circuit,
shunt capacitors (C1, C2, . . . ; C, C, . . . ) connected between said first and second line conductors,
switch means (S12, S23, . . . ; S*a*, S*b*) connected in circuit with one of said line conductors, and
means for applying periodic shift pulses to said switch means (S12, S23, . . . ; S*a*, S*b*) to effect closure thereof for producing pulse energy exchanges between said shunt capacitors (C1, C2, . . . ; C, C, . . . ), said shift pulse applying means applying time-spaced shift pulses to adjacent switches (S12, S23, . . . ; S*a*, S*b*),
said shift register including stages, each stage comprising first and second ones of said switch means (S*a*, S*b*) and at least first and second ones of said shunt capacitors (C, C), and wherein there is further provided,
an additional shift register having a pair of input terminals and a corresponding pair of line conductors and including,
first and second switch means (S*a*, S*b*) connected in circuit in one of said pair of line conductors, and
first and second shunt capacitors connected in shunt between said pair of line conductors,
said additional shift register being connected at its pair of input terminals to corresponding ones of said first and second line conductors of said shift circuit, intermediate two stages thereof, and
means for applying time-spaced shift pulse to adjacent ones of said switch means (S*a*, S*b*) of both said shift register and said additional shift register to effect pulse-energy exchanges in said associated shunt capacitors capacitors (C, C . . . and K, K) thereof.

7. A shift register as recited in claim 1 wherein there is further provided:
inductance means (L*a*, L*b*; L) connected in said first line conductor in series with an associated switch (S*a*) between a corresponding pair of shunt capacitors (C1, C2), and
said switch means (S*a*) is closed in response to a shift pulse for a time interval sufficient for completing a single energy exchange between the said associated shunt capacitors (C1, C2).

8. A shift register controlled by shift pulses and comprising:
first and second line conductors connected to first and second input terminals (*e*1, *e*2) of said circuit,
shunt capacitors (C1, C2, . . . ; C, C, . . . ) connected between said first and second line conductors,
switch means (S12, S23, . . . ; S*a*, S*b*) connected in circuit with one of said line conductors, and
means for applying periodic shift pulses to said switch means (S12, S23, . . . ; S*a*, S*b*) to effect closure thereof for producing pulse energy exchanges between said shunt capacitors (C1, C2, . . . ; C, C, . . . ), said shift pulse applying means applying time-spaced shift pulses to adjacent switch means (S12, S23, . . . ; S*a*, S*b*),
a supplemental capacitor (C11) connected in a parallel circuit with a respectively associated shunt capacitor (C01),
said parallel circuit including an amplifier element (T11) connected to said shunt capacitor (C01) and operative during intervals between pulse energy exchanges with said associated shunt capacitor (C01) to supply said supplemental capacitor (C11) with a charge corresponding to that of said shunt capacitor (C01), and
said supplemental capacitor (C11) providing a charge during a pulse energy exchange to compensate for energy losses during a pulse energy exchange from said shunt capacitor (C01) to another shunt capacitor (C02).

9. A shift register in accordance with claim 1 wherein:
said shift register comprises a line balancing network including two shunt capacitors (C1, C2).

10. A shift register controlled by shift pulses and comprising:
first and second line conductors connected to first and second input terminals (*e*1, *e*2) of said circuit,
shunt capacitors (C1, C2, . . . ; C, C, . . . ) connected between said first and second line conductors,
switch means (S12, S23, . . . ; S*a*, S*b*) connected in circuit with one of said line conductors, and
means for applying periodic shift pulses to said switch means (S12, S23, . . . ; S*a*, S*b*) to effect closure thereof for producing pulse energy exchanges between said shunt capacitors (C1, C2, . . . ; C, C, . . . ), said shift pulse applying means applying time-spaced shift pulses to adjacent switches (S12, S23, . . . ; S*a*, S*b*),
said shift register comprising a line balancing network including two shunt capacitors,
a first switch means (S*a*) connected in said one of said line conductors between the connections thereto of said two shunt capacitors (C1, C2), and
a second switch means (S*b*) connected in said one of said line conductors and across said second shunt capacitor (C2).

11. A shift register controlled by shift pulses and comprising:
first and second line conductors connected to first and second input terminals (*e*1, *e*2) of said circuit,
shunt capacitors (C1, C2, . . . ; C, C, . . . ) connected between said first and second line conductors,
switch means (S12, S23, . . . ; S*a*, S*b*) connected in circuit with one of said line conductors, and
means for applying periodic shift pulses to said switch means (S12, S23, . . . ; S*a*, S*b*) to effect closure thereof for producing pulse energy exchanges between said shunt capacitors (C1, C2, . . . ; C, C, . . . ), said shift pulse applying means applying time-spaced shift pulses to adjacent switches (S12, S23, . . . ; S*a*, S*b*),
said shift register comprising a line balancing network including two shunt capacitors,
a first switch means (S*a*) connected in circuit in said one of said line conductors between the connection thereto of said two shunt capacitors (C1, C2), and
a second switch means (S*b*) connected between said first and second line conductors intermediate said two shunt capacitors (C1, C2) and operable when closed to produce a short circuit therebetween.

12. A shift register controlled by shift pulses and comprising:

first and second line conductors connected to first and second input terminals ($e1$, $e2$) of said circuit, shunt capacitors (C1, C2, . . . ; C, C, . . . ) connected between said first and second line conductors, switch means (S12, S23, . . . ; S$a$, S$b$) connected in circuit with one of said line conductors, and means for applying periodic shift pulses to said switches (S12, S23, . . . ; S$a$, S$b$) to effect closure thereof for producing pulse energy exchanges between said shunt capacitors (C1, C2, . . . ; C, C, . . . ), said shift pulse applying means applying time-spaced shift pulses to adjacent switches (S12, S23, . . . ; S$a$, S$b$), said shift register comprising a line balancing network including two shunt capacitors, said line balancing network being short circuited at its output side between said line conductors.

References Cited

UNITED STATES PATENTS

| | | | |
|---|---|---|---|
| 2,798,983 | 7/1957 | Warman | 340—173 X |
| 3,172,043 | 3/1965 | Altman | 328—122 X |
| 3,253,162 | 5/1966 | Barnes et al. | 307—221 X |
| 3,258,614 | 6/1966 | Burlak | 307—221 |
| 3,289,010 | 11/1966 | Bacon et al. | 307—221 |

ROBERT K. SCHAEFER, Primary Examiner

T. B. JOIKE, Assistant Examiner

U.S. Cl. X.R.

333—29, 31; 235—183; 328—37, 165; 307—221, 233